US006788892B2

(12) United States Patent
Yano

(10) Patent No.: US 6,788,892 B2
(45) Date of Patent: Sep. 7, 2004

(54) STROBE LIGHT-EMISSION CONTROL APPARATUS

(75) Inventor: Takashi Yano, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/452,204

(22) Filed: Jun. 3, 2003

(65) Prior Publication Data

US 2003/0228143 A1 Dec. 11, 2003

(30) Foreign Application Priority Data

Jun. 6, 2002 (JP) ....................................... 2002-165251
Jul. 4, 2002 (JP) ....................................... 2002-195402

(51) Int. Cl.[7] ................................................ G03B 15/05

(52) U.S. Cl. ........................ 396/157; 396/159; 396/161; 348/364; 348/371

(58) Field of Search ......................... 396/157, 159–161; 348/363–365, 370, 371; 315/241 P, 151

(56) References Cited

U.S. PATENT DOCUMENTS 4,531,078 A * 7/1985 Canter et al. ............... 315/151

* cited by examiner

*Primary Examiner*—W. B. Perkey
(74) *Attorney, Agent, or Firm*—Birch, Stewart, Kolasch & Birch, LLP

(57) ABSTRACT

When a strobe flash is not emitting light, a photoreception current that is output from a phototransistor is detected and correction current corresponding to amount of extraneous light is produced by a voltage-controlled current source. Further, a light-emission control apparatus, receives emitted light reflected from the subject and halts the light emission when a value obtained by integrating a photoreception signal exceeds a first predetermined threshold value. If a period of time from start of light emission by the discharge tube to that at which the integrated value exceeds the threshold value falls within a predetermined period of time, the integrated value is reset and integration is performed again. Further, the aperture of a diaphragm is reduced and the threshold value is raised from the first threshold value to a second threshold value.

7 Claims, 7 Drawing Sheets

STROBE LIGHT-EMISSION CONTROL APPARATUS

BACKGROUND OF THE INVENTION

1. Field of the Invention

This invention relates to a strobe light-emission control apparatus.

2. Description of the Related Art

An autodimming strobe emits strobe light toward a subject and receives reflected light from the subject by a photoreceptor sensor. The signal that is output from the sensor is integrated by an integrating circuit and the light emission from the strobe is halted when the integrated value attains a predetermined threshold value.

When a light source (extraneous light) falls within a range in which it is sensible by the photoreceptor sensor, however, not only reflected strobe light but also light emitted from the light source is received by the photoreceptor sensor. A signal obtained based upon the light emitted from the light source also is integrated by the integrating circuit. As a consequence, the integrated value attains the predetermined threshold value earlier than the time at which the strobe light emission should be terminated and, hence, there are instances where the image obtained is too dark.

Further, when the subject is a short distance away, it is required that the autodimming strobe control the light emission comparatively accurately so as to reduce the total amount of light that illuminates the subject. However, since it is comparatively difficult to accurately control the light emission of a strobe flash unit, often accurate control of the total amount of light that illuminates the subject is difficult to achieve.

SUMMARY OF THE INVENTION

Accordingly, an object of the present invention is to exclude the effects of extraneous light in control of a strobe light emission.

Another object of the present invention is to control, in comparatively accurate fashion, the total amount of light that illuminates a subject.

Accordingly to a first aspect of the present invention, the foregoing objects are attained providing a strobe light-emission control apparatus comprising: a photoreceptor for outputting a signal that conforms to amount of received incident light; a strobe light-emission control circuit for controlling a strobe flash device in such a manner that a subject is illuminated with strobe light; a subtracting circuit for subtracting, from a first signal that is output from the photoreceptor at emission of strobe light from the strobe flash device, a second signal that was being output from the photoreceptor during non-emission of strobe light from the strobe flash device; an integrating circuit for integrating a signal obtained by subtraction by the subtracting circuit; and a strobe light-emission halt control circuit for controlling the strobe flash device so as to halt emission of strobe light based upon amount of integration by the integrating circuit.

A control method suited to the strobe light-emission control apparatus of the present invention may also be provided. Specifically, there is provided a method of controlling a strobe light-emission control apparatus having a photoreceptor for outputting a signal that conforms to amount of received incident light, and a strobe light-emission control circuit for controlling a strobe flash device in such a manner that a subject is illuminated with strobe light, the method comprising the steps of: subtracting, from a first signal that is output from the photoreceptor at emission of strobe light from the strobe flash device, a second signal that was being output from the photoreceptor during non-emission of strobe light from the strobe flash device; integrating a signal obtained by subtraction; and controlling the strobe flash device so as to halt emission of strobe light based upon amount of integration.

In accordance with the first aspect of the present invention, a signal conforming to amount of incident light is output from the photoreceptor. The second signal is output from the photoreceptor when strobe light is not being emitted by the strobe light-emission control circuit. (If necessary, a detection circuit for detecting the second signal would be provided.) If extraneous light falls within the light-receiving range of the photoreceptor, the second signal indicates the amount of this extraneous light. The first signal is output from the photoreceptor when strobe light is being emitted by the strobe light-emission control circuit. The first signal indicates the total of extraneous light and strobe light that has been reflected from the subject.

The second signal is subtracted from the first signal by the subtracting circuit, and the signal that results from the subtraction operation is integrated by the integrating circuit. When the amount of integration by the integrating circuit attains a predetermined threshold value, the emission of strobe light is halted.

The subtracting circuit integrates the signal from which extraneous light has been excluded, i.e., the signal indicating the reflected strobe light. Control for halting the emission of light by the strobe flash device can be performed comparatively accurately.

Preferably, the subtracting circuit subtracts the second signal, which was being output from the photoreceptor at non-emission of strobe light immediately prior to emission of the strobe light, from the first signal for a period of time from emission of strobe light that is based upon control by the strobe light-emission control circuit to halting of emission of strobe light that is based upon control by the strobe light-emission halt control circuit. Thus, the effects of extraneous light can be excluded during emission of the strobe light.

Accordingly to a second aspect of the present invention, the foregoing objects are attained providing a strobe light-emission control apparatus comprising: a photoreceptor for outputting a photoreception signal that conforms to amount of received incident light; a first strobe light-emission control circuit for controlling a strobe flash device so as to illuminate a subject with strobe light and halt emission of light in response to a strobe light-emission halt signal applied thereto; an integrating circuit, which is reset with start of light emission by the strobe flash device and is reset in response to a reset signal applied thereto, for integrating the photoreception signal output from the photoreceptor; a comparison circuit for comparing an integrated value from the integrating circuit and a first reference signal and outputting a detection signal in response to the first reference value being surpassed by the integrated value; and a first control circuit for outputting the reset signal to the integrating circuit in response to output of the detection signal, which is output from the comparison circuit, prior to elapse of a first predetermined time from start of light emission by the strobe flash device, and outputting the strobe light-emission halt signal to the first strobe light-emission control circuit in response to output of the detection signal after elapse of the first predetermined time from start of light emission by the strobe flash device.

A method of controlling the strobe light-emission control apparatus of the second aspect of the present invention may also be provided. Specifically, there is provided a method of controlling a strobe light-emission control apparatus having a photoreceptor for outputting a photoreception signal that conforms to amount of received incident light, a first strobe light-emission control circuit for controlling a strobe flash device so as to illuminate a subject with strobe light and halt emission of light in response to a strobe light-emission halt signal applied thereto, and an integrating circuit, which is reset with start of light emission by the strobe flash device and is reset in response to a reset signal applied thereto, for integrating the photoreception signal output from the photoreceptor; the method comprising the steps of: comparing an integrated value from the integrating circuit and a first reference signal and outputting a detection signal in response to the first reference value being surpassed by the integrated value; and outputting the reset signal to the integrating circuit in response to output of the detection signal prior to elapse of a first predetermined time from start of light emission by the strobe flash device, and outputting the strobe light-emission halt signal to the first strobe light-emission control circuit in response to output of the detection signal after elapse of the first predetermined time from start of light emission by the strobe flash device.

In accordance with the second aspect of the present invention, a subject is illuminated with strobe light from a strobe flash device. Reflected strobe light from the subject is received by the photoreceptor, which outputs a photoreception signal. The strobe light-emission control apparatus is provided with an integrating circuit that is reset with start of light emission by the strobe flash device. The photoreception signal is integrated by this integrating circuit. The integrated value from the integrating circuit and a first reference value are compared by the comparison circuit, which outputs a detection signal when the integrated value exceeds the first reference value. In a case where the detection signal is output prior to the elapse of a first predetermined time from start of light emission by the strobe flash device, a reset signal is output to the integrating circuit to reset the same. Thus the integrating operation of the integrating circuit is performed from the beginning. In a case where the detection signal is output after elapse of the first predetermined time from the start of the light emission by the strobe flash device, a strobe light-emission halt signal is output to the strobe light-emission control circuit, whereby the strobe light emission of the strobe flash device is halted.

The characteristic of the light that exits from the strobe flash device rises sharply immediately after the start of the light emission and then declines gradually. In a case where control such as for halting the strobe light emission is performed immediately after the start of the light emission, therefore, it is necessary to perform control comparatively accurately. The second aspect of the present invention is such that in a case where the detection signal is detected within the first predetermined time from the start of the strobe light emission, the integrating circuit is reset, the integrating circuit integrates the photoreception signal obtained at such time that the light exiting the strobe flash device has become small and control for halting the strobe light emission based upon the integrated value is carried out again. The total amount of light that illuminates the subject can be controlled comparatively correctly even if control for halting the strobe light emission is not accurate. It goes without saying that if control for halting the strobe light emission is carried out again in this strobe light-emission control apparatus, the subject is imaged in sync with this re-execution of control and the image data obtained by such imaging is recorded on a recording medium. Further, if control for halting the strobe light emission is not carried out again, image data obtained by imaging the subject in sync with the start of the light emission from the strobe flash unit would be recorded on the recording medium.

The strobe light-emission control apparatus described above may be applied to an electronic digital camera having a solid-state electronic image sensing device for sensing the image of a subject and outputting a video signal representing the image of the subject, and a diaphragm placed in front of the photoreceptor surface of the solid-state electronic image sensing device. In this case, stored electric charge in the solid-state electronic image sensing device would be reset in response to output of the reset signal from the first control circuit. The apparatus further comprises a second control circuit for controlling the diaphragm so as to reduce the aperture, comparing the integrated value from the integrating circuit and a second reference value that is greater than the first reference value, and controlling the comparison circuit so as to output the detection signal in response to the second reference value being surpassed by the integrated value.

Since the diaphragm aperture is made small, the amount of light per unit time that impinges upon the photoreceptor surface of the solid-state electronic image sensing device is reduced. Image data representing an image having a comparatively appropriate amount of exposure is obtained even if timing of control for halting the strobe light emission is not accurate.

The second control circuit is so adapted that control of the diaphragm and control of the comparison circuit is performed in response to output of the detection signal from the comparison circuit to the strobe flash device prior to elapse of a second predetermined time, which is shorter than the first predetermined time, from the start of strobe light emission.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

Figure 1:
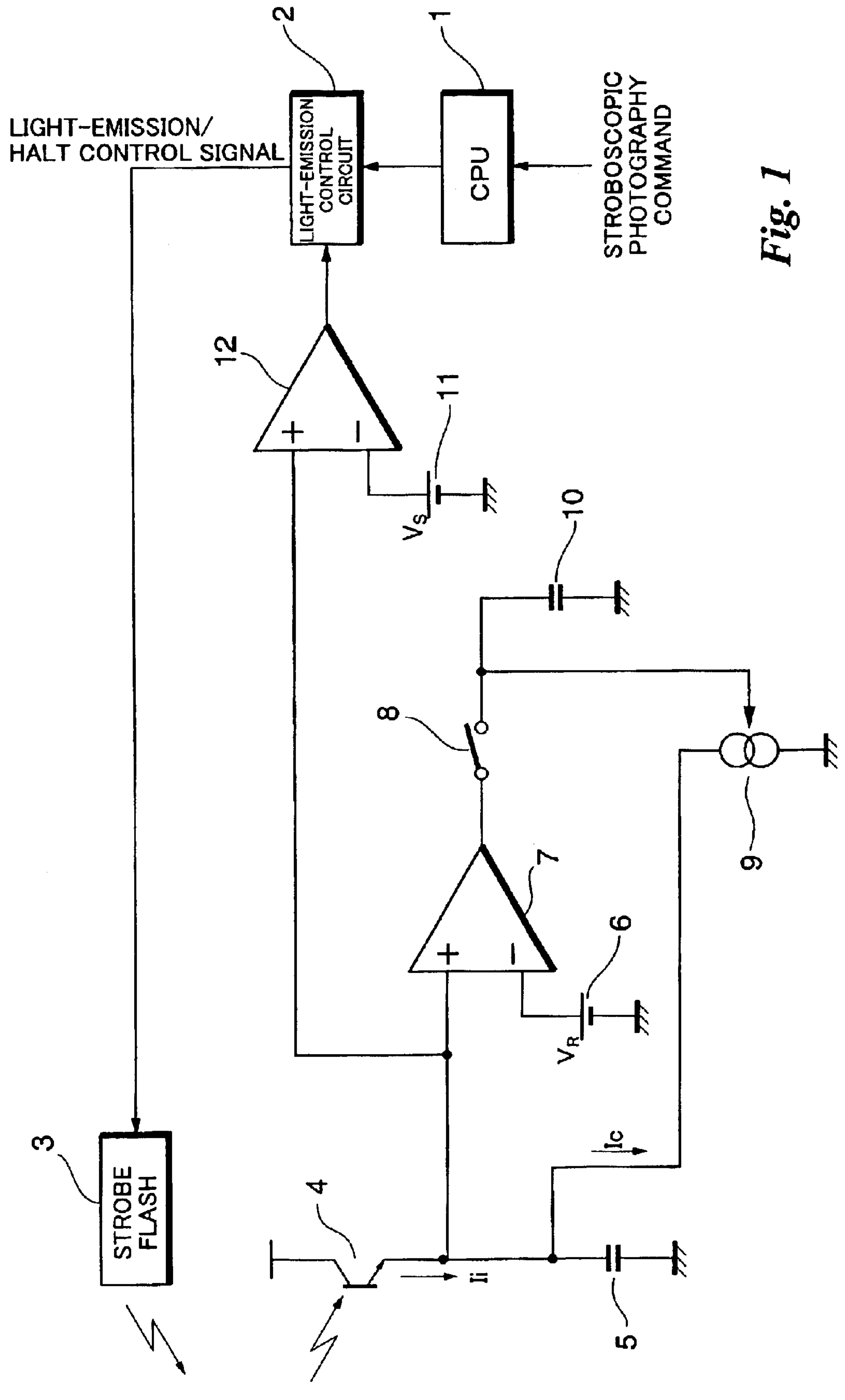
FIG. 1 is a block diagram illustrating the electrical structure of a strobe light-emission control apparatus according to a first embodiment of the present invention.
Figure 2:
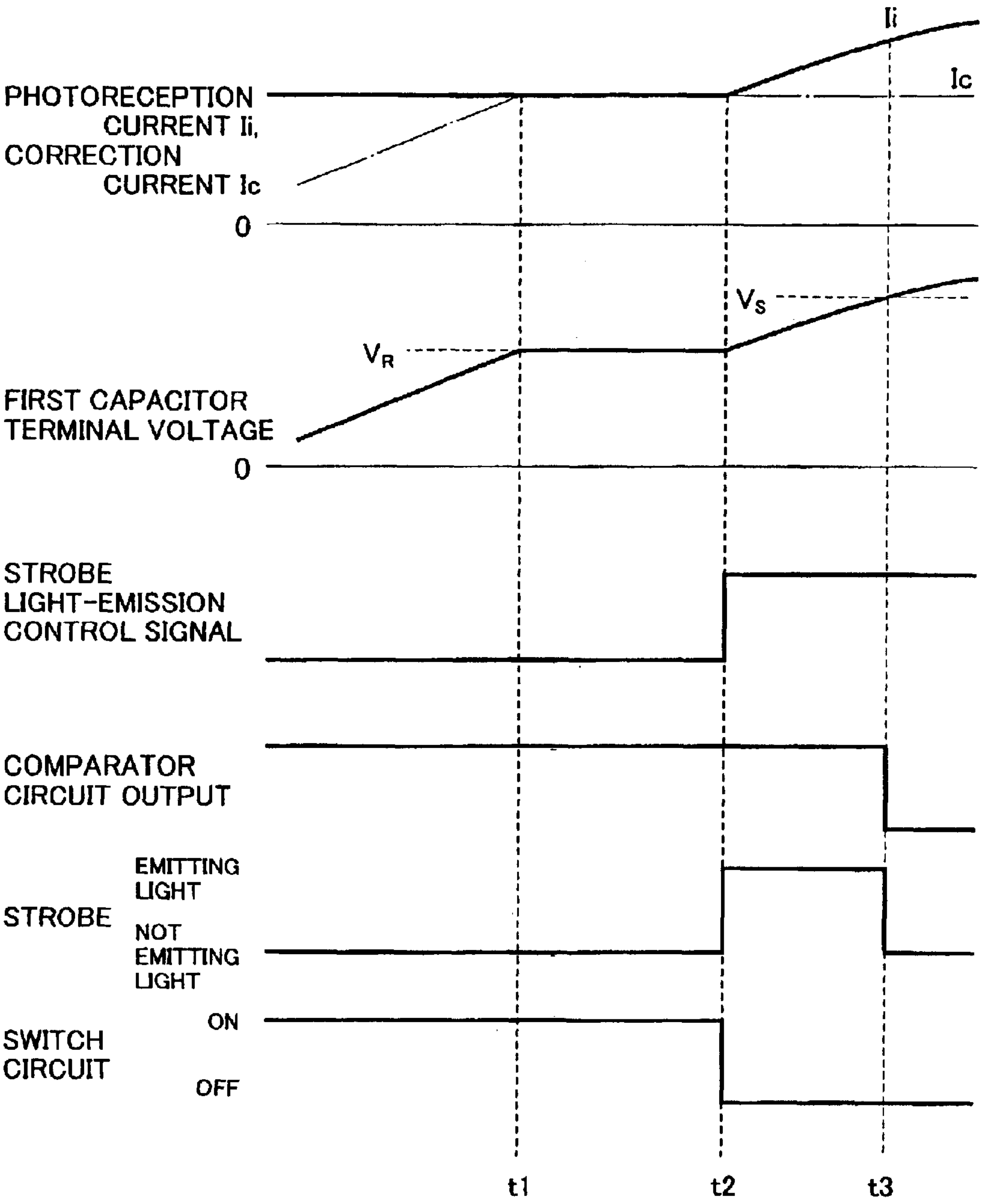
FIG. 2 is a time chart illustrating current that flows into each circuit of the strobe light-emission control apparatus.

FIG. 1 is a circuit diagram illustrating a strobe light-emission control apparatus according to a first embodiment of the present invention, and FIG. 2 is a time chart illustrating current that flows into each circuit of the strobe light-emission control apparatus. The apparatus is provided in a digital still camera. In this embodiment, the strobe light-emission control apparatus is provided with a strobe flash 3. The latter may be removably attached to the apparatus.

The strobe light-emission control apparatus according to this embodiment is an autodimming strobe control apparatus of the type that emits strobe light toward a subject, receives reflected light from the subject and halts emission of light from the strobe flash responsive to the amount of received light attaining a predetermined value. The strobe control apparatus excludes the effects of extraneous light, namely light other than reflected strobe light. In order to exclude the effects of extraneous light, namely light other than reflected strobe light, a signal indicative of the extraneous light is subtracted from a signal that indicates reflected light received by a photoreceptor. The details of this operation will become clear from the description that follows.

The strobe control apparatus includes a CPU 1. A stroboscopic photography command is applied by the user and the command is input to the CPU 1, whence the command is input to a light-emission control circuit 2. The latter outputs a light-emission/halt control signal for controlling light emission of the strobe flash 3 and termination of the light emission. Control of light emission or termination thereof from the strobe flash 3 is performed based upon the applied light-emission/halt control signal.

The strobe control apparatus includes a phototransistor (photoreceptor) 4. The photodiode 4 has an emitter terminal, which is connected to a first capacitor 5, a voltage-controlled current source 9, a positive input terminal of a differential amplifier circuit 7 for detecting a correction current and a positive input terminal of a comparison circuit 12.

A power supply 6 for applying a first threshold-value voltage VR is connected to a negative input terminal of the differential amplifier circuit 7. The latter outputs a differential voltage between the voltage applied to the positive input terminal and the first threshold-value voltage VR applied to the negative input terminal. The output side of the differential amplifier circuit 7 is formed to have a switch circuit 8. When the switch circuit 8 is turned ON (closed), the output voltage of the differential amplifier circuit 7 is applied to the voltage-controlled current source 9 as a control signal. A second capacitor 10 is connected to the output terminal of the differential amplifier circuit 7 via the switch circuit 8. Signal charge accumulates in the second capacitor 10 in accordance with the output voltage of the differential amplifier circuit 7.

A power supply 11, which applies a second threshold-value voltage VS that is greater than the first threshold-value voltage VR, is connected to the negative input terminal of the comparison circuit 12. The latter outputs a voltage indicating the difference between the voltage of the first capacitor 5 applied to the positive input terminal and the second threshold-value voltage VS applied to the negative input terminal. The output voltage of the comparison circuit 12 is input to the light-emission control circuit 2.

The phototransistor 4 outputs a current (photoreception current) Ii that conforms to the amount of incident light. If a light source (extraneous light) falls within the light receiving range of the phototransistor 4, the photoreception current Ii is input to the first capacitor 5 and electric charge accumulates in the first capacitor 5 even in a case where the strobe flash 3 is not emitting light (prior to time t1). The photoreception current Ii is input to the first capacitor 5 and the capacitor accumulates electric charge. Owing to the accumulated charge, the terminal voltage of the first capacitor 5 gradually rises, whereupon the output voltage of the differential amplifier circuit 7 gradually declines. A correction current Ic output from the voltage-controlled current source 9 gradually rises. The photoreception current Ii output from the phototransistor 4 and the correction current Ic output from the voltage-controlled current source 9 become equal at time t2. The strobe light-emission control signal output from the light-emission control circuit 2 based upon control by the CPU 1 rises to the H level and the strobe flash 3 emits light. The switch circuit 8 is turned off at the same time that the strobe light-emission control signal rises to the H level, whereupon the terminal voltage of the second capacitor 10 is applied to the voltage-controlled current source 9 as a control signal. An electric charge corresponding to the amount of extraneous light is charged in the second capacitor 10 at time t2. The terminal voltage of the second capacitor 10 is applied to the voltage-controlled current source 9 as a control signal. The correction current Ic, which conforms to the amount of extraneous light, is generated by the voltage-controlled current source 9.

The strobe flash 3 emits light at time t2 and the strobe light illuminates the subject. Strobe light reflected from the subject is received by the phototransistor 4, and the photoreception current Ii conforming to the output of received light is output from the phototransistor 4. The photoreception current Ii output from the phototransistor 4 when the strobe flash 3 is emitting light includes current obtained owing to reception of the reflected strobe light and current obtained owing to reception of extraneous light. When strobe light is being emitted from the strobe flash 3, the correction current Ic generated by the voltage-controlled current source 9 and conforming to the amount of extraneous light as described above is subtracted from the photoreception current Ii output from the phototransistor 4. Current from which the effects of extraneous light have been eliminated enters the first capacitor 5 and signal charge based upon the reflected strobe light is charged up in the capacitor.

As signal charge accumulates in the first capacitor 5, the terminal voltage of the first capacitor 5 gradually rises. The terminal voltage of the first capacitor 5 is applied also to the positive input terminal of the comparison circuit 12, as described above. If the terminal voltage of the first capacitor 5 exceeds the second threshold-value voltage VS (time t3), the output of the comparison circuit 12 falls from the H to the L level. When this occurs, it is construed that proper exposure has been achieved and the emission of strobe light from the strobe flash 3 is terminated by the light-emission control circuit 2.

Since automatic dimming control of the strobe flash 3 can be performed upon excluding the effects of extraneous light, control is comparatively accurate.

Figure 3:
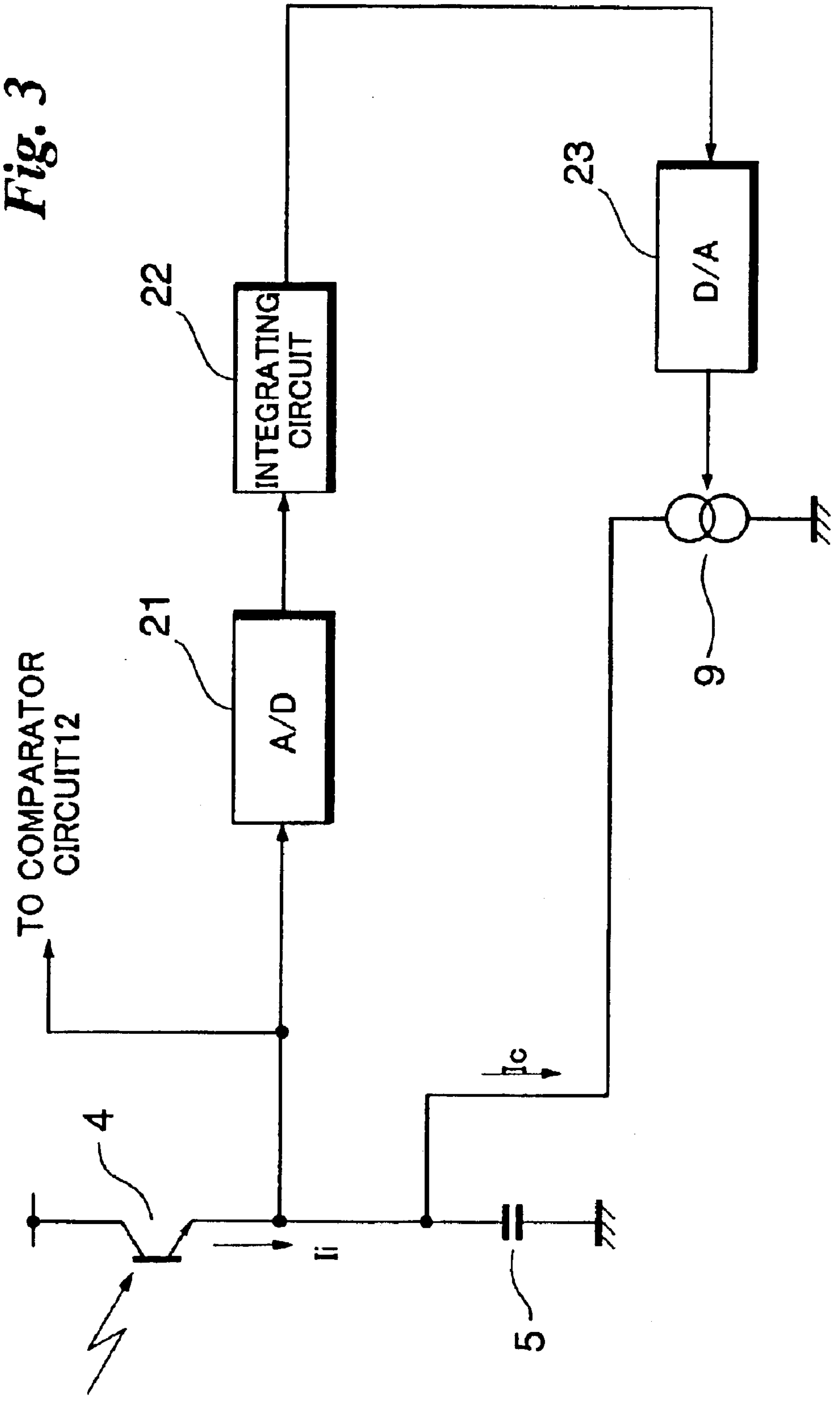
FIG. 3 is a block diagram illustrating part of the electrical structure of a strobe light-emission control apparatus according to a modification of the above embodiment.

FIG. 3 illustrates part of the electrical structure of the strobe light-emission control apparatus according to a modification of the above embodiment. Components in FIG. 3 identical with those shown in FIG. 1 are designated by like reference characters.

In the strobe control apparatus shown in FIG. 1, the correction current Ic is generated using the differential amplifier circuit 7, switch circuit 8, voltage-controlled current source 9 and second capacitor 10. However, it may be so arranged that a digital circuit is used for this purpose in the manner set forth below.

Specifically, the output voltage of the first capacitor 5 is converted to digital data by an analog/digital converting circuit 21. The digital data is applied and integrated by an integrating circuit 22. The output of the integrating circuit 22 is converted to an analog signal by a digital/analog converting circuit 23. The analog signal is applied to the voltage-controlled current source 9 as the control signal. The voltage-controlled current source 9 is controlled by the analog signal obtained based upon the output of the integrating circuit 22 prevailing immediately prior to emission of the strobe light, and the voltage-controlled current source 9 produces the correction current Ic.

Figure 4:
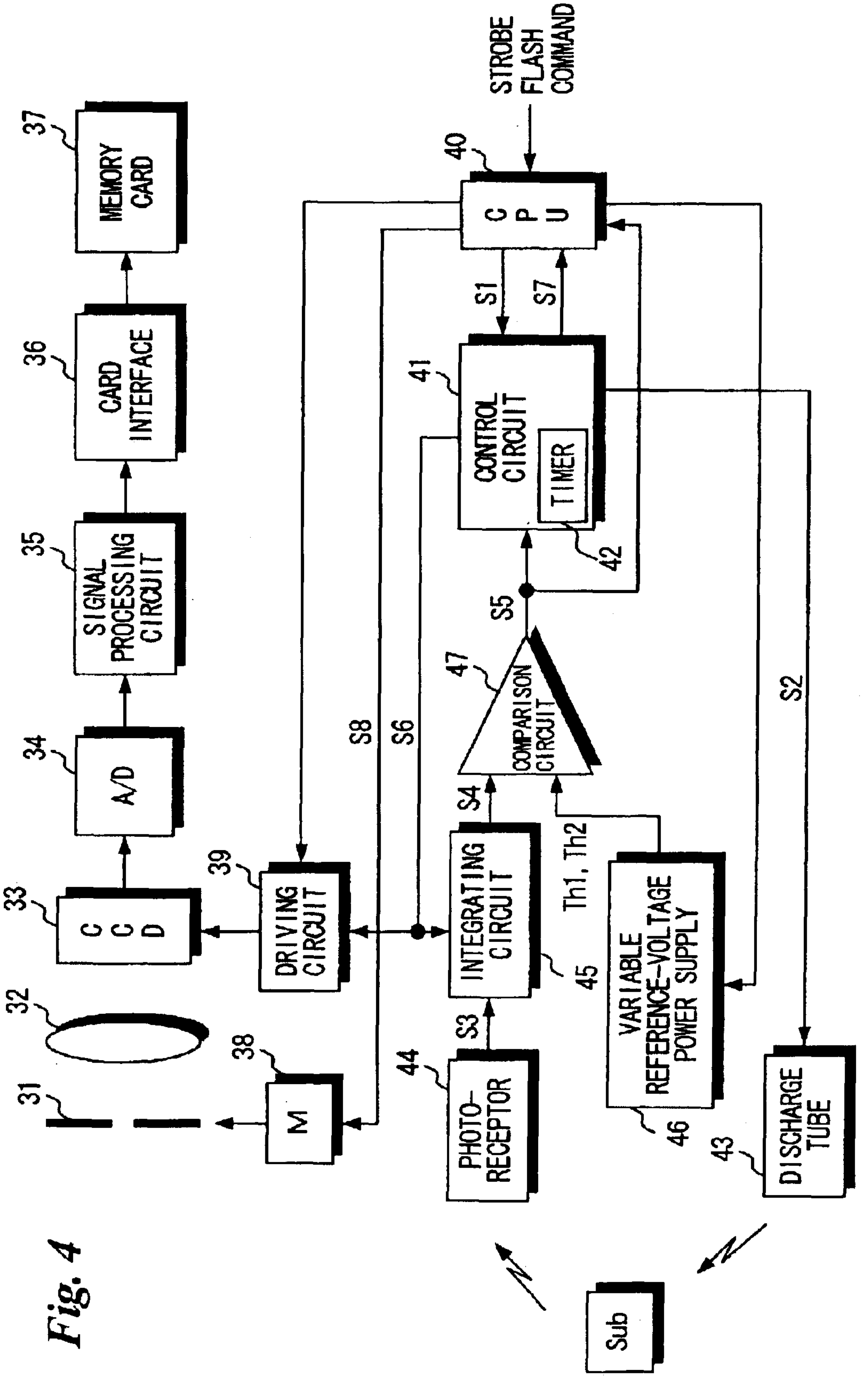
FIG. 4 is a block diagram illustrating the electrical structure of a digital still camera according to a second embodiment of the present invention.

FIG. 4 is a block diagram illustrating part of the electrical structure of a digital still camera according to a second embodiment of the present invention.

The overall operation of the digital still camera is controlled by a CPU 40.

A strobe flash command provided by the user (in a case where a strobe flash mode or the like has been set, the strobe flash command is generated by pressing a shutter-release button) is input to the CPU 40. When this occurs, a strobe flash command signal S1 is input to a control circuit 41. The control circuit 41 outputs a strobe control signal S2 for controlling the emission of strobe light. Strobe light is emitted from a discharge tube 43 and illuminates a subject Sub. The control circuit 41 includes a timer 42, which starts measuring time with the start of light emission from the discharge tube 43.

Light reflected from the subject Sub impinges upon a photoreceptor 44. The latter outputs a photoreception signal S3 that conforms to the amount of received light. The photoreception signal S3 is input to and integrated by an integrating circuit 45. An integrated signal S4 indicating the integrated value from the integrating circuit 45 is applied to one input terminal of a comparison circuit 47. A threshold-value voltage output from a variable reference-voltage power supply 46 is applied to the other input terminal of the comparison circuit 47. The variable reference-voltage power supply 46 is changed over between a first threshold-value voltage Th1 and a second threshold-value voltage Th2 based upon a changeover control signal from the CPU 40. As mentioned above, the first threshold-value voltage Th1 or second threshold-value voltage Th2 is applied to the other input terminal of the comparison circuit 47.

When the integrated signal S4 that is input to the one input terminal of the comparison circuit 47 exceeds the threshold-value voltage applied to the other input terminal thereof from the variable reference-voltage power supply 46, the comparison circuit 47 outputs a detection signal S5. The latter is input to the strobe control circuit 41 and CPU 40. More specifically, if the detection signal S5 enters the control circuit 41 within a first predetermined time from start of light emission from the discharge tube 43, as will be described later, the control circuit 41 outputs a reset signal S6, which enters the integrating circuit 45 and a driving circuit 39. When this occurs, the integrating circuit 45 is reset and integration of the photoreception signal S3 output from the photoreceptor 44 starts again from the beginning. If the photoreception signal S3 does not enter the control circuit 41 within the first predetermined time from start of light emission from the discharge tube 43, the strobe control signal S2 for controlling termination of the strobe light emission is applied to the discharge tube 43 from the control circuit 41 in response to entry of the detection signal S5 to the control circuit 41 following elapse of the first predetermined time. As a result, the discharge tube 43 stops emitting strobe light.

A diaphragm 31 and an imaging lens 32 are provided in front of the photoreceptor surface of a CCD (solid-state electronic image sensing device) 33. The f/stop of the diaphragm 31 is controlled by a diaphragm motor 38, which is controlled by the CPU 40. Light indicating the light image of the subject Sub passes through the aperture of the diaphragm 31 and is transmitted by the imaging lens 32, whereby the image is formed on the photoreceptor surface of the CCD 33. The CCD 33 is controlled based upon a drive control signal from the driving circuit 39. The CCD 33 outputs an analog video signal representing the image of the subject, and the video signal enters the analog/digital converting circuit 34. The latter converts the analog video signal to digital image data. The digital image data obtained by the conversion is subjected to prescribed signal processing such as a gamma correction and white balance adjustment in a signal processing circuit 35. The image data is applied to and recorded on a memory card 37 via a card interface 36.

Figure 5:
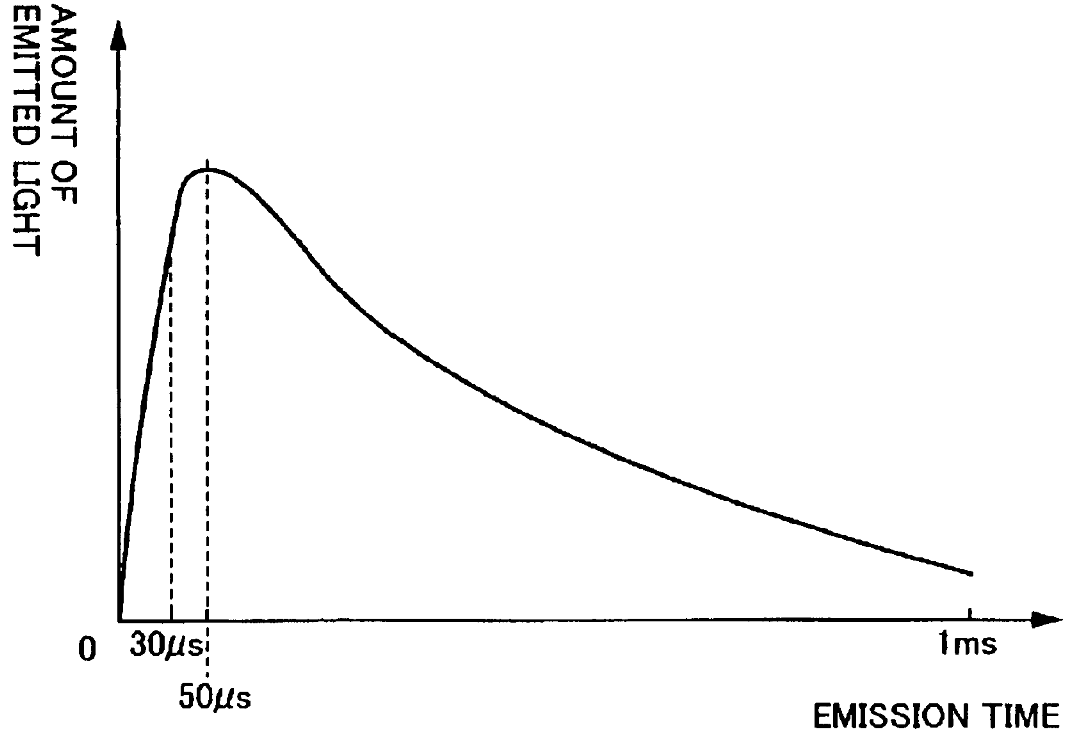
FIG. 5 is a diagram illustrating the characteristic of a discharge lamp, namely amount of light emitted versus emission time.

FIG. 5 is a diagram illustrating the characteristic of the discharge lamp 43, namely amount of light emitted versus emission time.

The amount of light emitted from the discharge tube 43 rises sharply immediately after the start of light emission and then declines gradually as time passes. For example, the amount of emitted light peaks 50 μs after the start of light emission and then decreases gradually.

Thus, since a large portion of the light that exits from the discharge tube 43 exits immediately after start of the emission, it is required that termination of the light exiting from the discharge tube 43 be controlled comparatively accurately, in order to adjust the amount of light that illuminates the subject, by halting the light emission immediately after it starts. This embodiment is such that if the integrated signal exceeds the threshold-value voltage output from the variable reference-voltage power supply 46, as mentioned above, by the time the first predetermined time (50 μs) elapses from start of the light emission by the discharge tube 43, then it is judged that accurate exposure control cannot be performed because the subject Sub is too close. When this occurs, the subject is imaged by light that exits from the discharge tube 43 following elapse of the first predetermined time from start of the light emission by the discharge tube 43.

Figure 6:
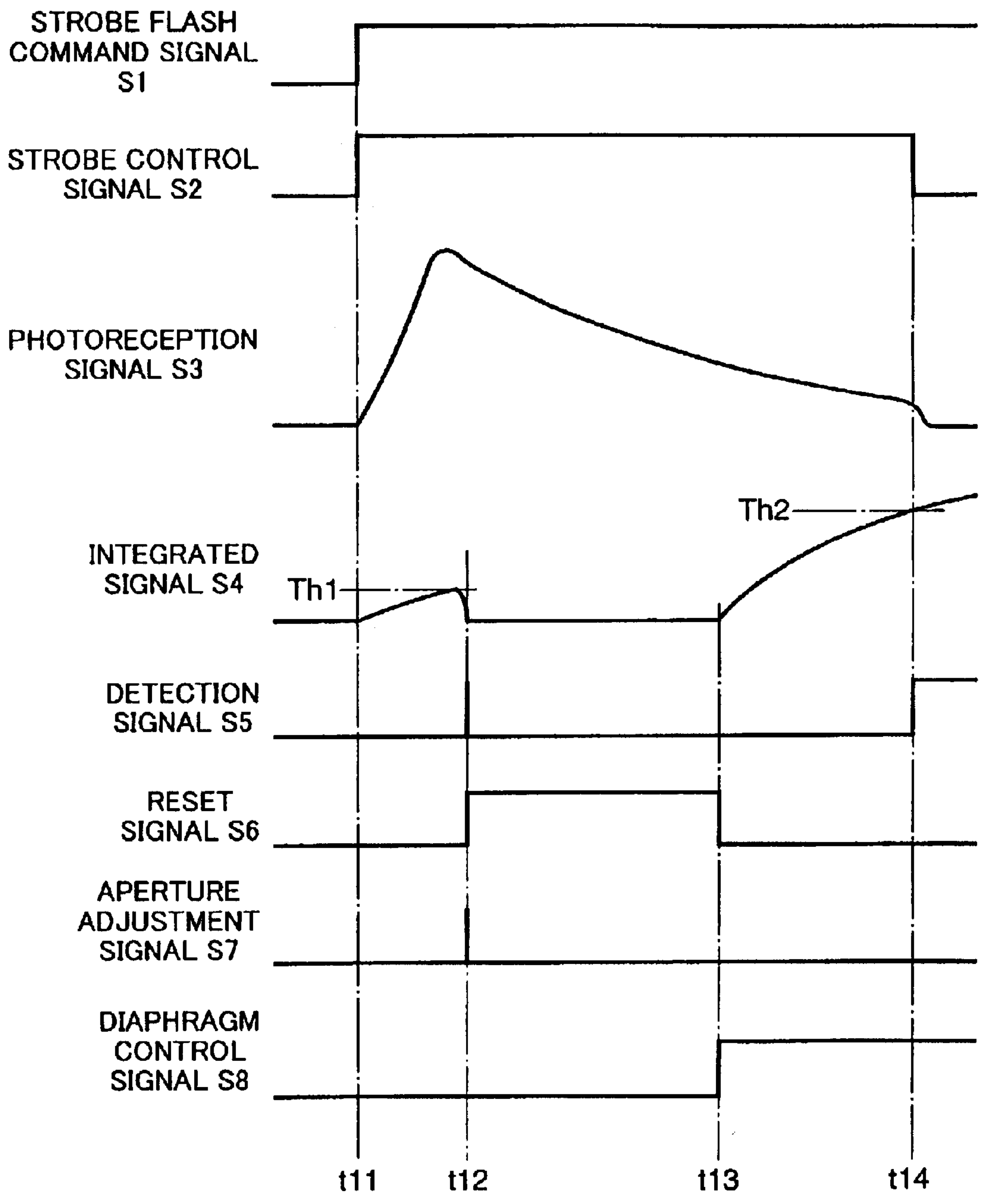
FIGS. 6 and 7 are time charts illustrating signals that flow into each of the circuit of the digital still camera.

FIG. 6 is a time chart illustrating signals that flow through the circuits of the digital still camera shown in FIG. 4.

If a shutter-release button (not shown) is pressed when the digital still camera has been set to a strobe flash mode, a strobe flash command is applied to the CPU 40. When this occurs, the strobe flash command signal S1 is applied to the control circuit 41 from the CPU 40 at time t11. When the strobe flash command signal S1 is input to the control circuit 41, the latter applies the strobe control signal S2 to the discharge tube 43, in response to which the discharge tube 43 starts emitting light. The timer 42 is reset at the same time that the strobe control signal S2 is applied to the discharge tube 43 from the control circuit 41, whereby the timer 42 starts measuring time.

The light that exits from the discharge tube 43 illuminates the subject Sub, and the light reflected from the subject Sub is received by the photoreceptor 44. The latter outputs the photoreception signal S3, which conforms to the amount of received light. The level vs. time characteristic of the photoreception signal S3 is the same as the characteristic of a discharge lamp, namely the amount of emitted light versus emission time. The level rises sharply immediately after the start of the light emission from the discharge tube 43 and then declines gradually with the passage of time.

The photoreception signal S3 output from the photoreceptor 44 is integrated by the integrating circuit 45. The integrated signal S4, which indicates the integrated value obtained by the integrating circuit 45, is input to one input terminal of the comparison circuit 47. The variable reference-voltage power supply 46 first outputs the first threshold-value voltage Th1, which is input to the other input terminal of the comparison circuit 47. When the integrated signal S4 exceeds the first threshold-value voltage Th1, the comparison circuit 47 outputs the detection signal S5, which enters the control circuit 41.

If time t12 at which the detection signal S5 enters the control circuit 41 is a time that prevails before elapse of the first predetermined time (50 μs) (FIG. 5 illustrates a case where time t12 is earlier than the first predetermined time), it is construed that the subject Sub is close to the digital still camera, as mentioned above. Since the amount of light reflected from the subject Sub per unit time is great, it is necessary to control termination of the light emission from the discharge tube 43 accurately. However, since controlling the termination of the light emission from the discharge tube 43 accurately is comparatively difficult, accurate exposure control cannot be carried out. The control circuit 41 supplies the reset signal S6 to the integrating circuit 45.

Further, when the detection signal S5 enters the control circuit 41 before the first predetermined time elapses, the control circuit 41 applies an aperture adjustment signal S7 to the CPU 40. When this is done, the CPU 40 applies a diaphragm control signal S8 to the diaphragm motor 38. The aperture of the diaphragm 31 is reduced by the diaphragm motor 38. Furthermore, the CPU 40 changes the threshold-value voltage, which is output from the variable reference-voltage power supply 46, from the first threshold-value voltage Th1 to the second threshold-value voltage Th2, which is greater than Th1.

When time t13 arrives and the integrating circuit 45 is reset fully, integration of the photoreception signal S3 by the integrating circuit 45 starts again.

At time t14, the integrated signal S4 output from the integrating circuit 45 exceeds the second threshold-value voltage Th2, whereupon the comparison circuit 47 outputs the detection signal S5 again. This signal enters the control circuit 41. Since the detection signal enters the control circuit 41 upon passage of the first period of time from start of the light emission from the discharge tube 43, a strobe control signal for terminating the light emission is sent from the control circuit 41 to the discharge tube 43. Thus, the discharge tube 43 stops emitting light.

Image data representing the image captured by the CCD 33 from time t13 to time t14 is recorded on the memory card 37. During the period from time t13 to time t14, the amount of light emitted from the discharge tube 43 per unit time is comparatively small. This means that control of exposure of the CCD 33 can be performed comparatively accurately even if control for halting the light emission is not performed accurately. In particular, the diaphragm 31 is controlled so as to reduce the aperture, and an adjustment is made so as to enlarge the threshold-value voltage applied to the comparison circuit 47. As a result, time until the detection signal S5 is output again from the comparison circuit 47 is lengthened. Thus, exposure control can be realized in a comparatively accurate manner.

Figure 7:
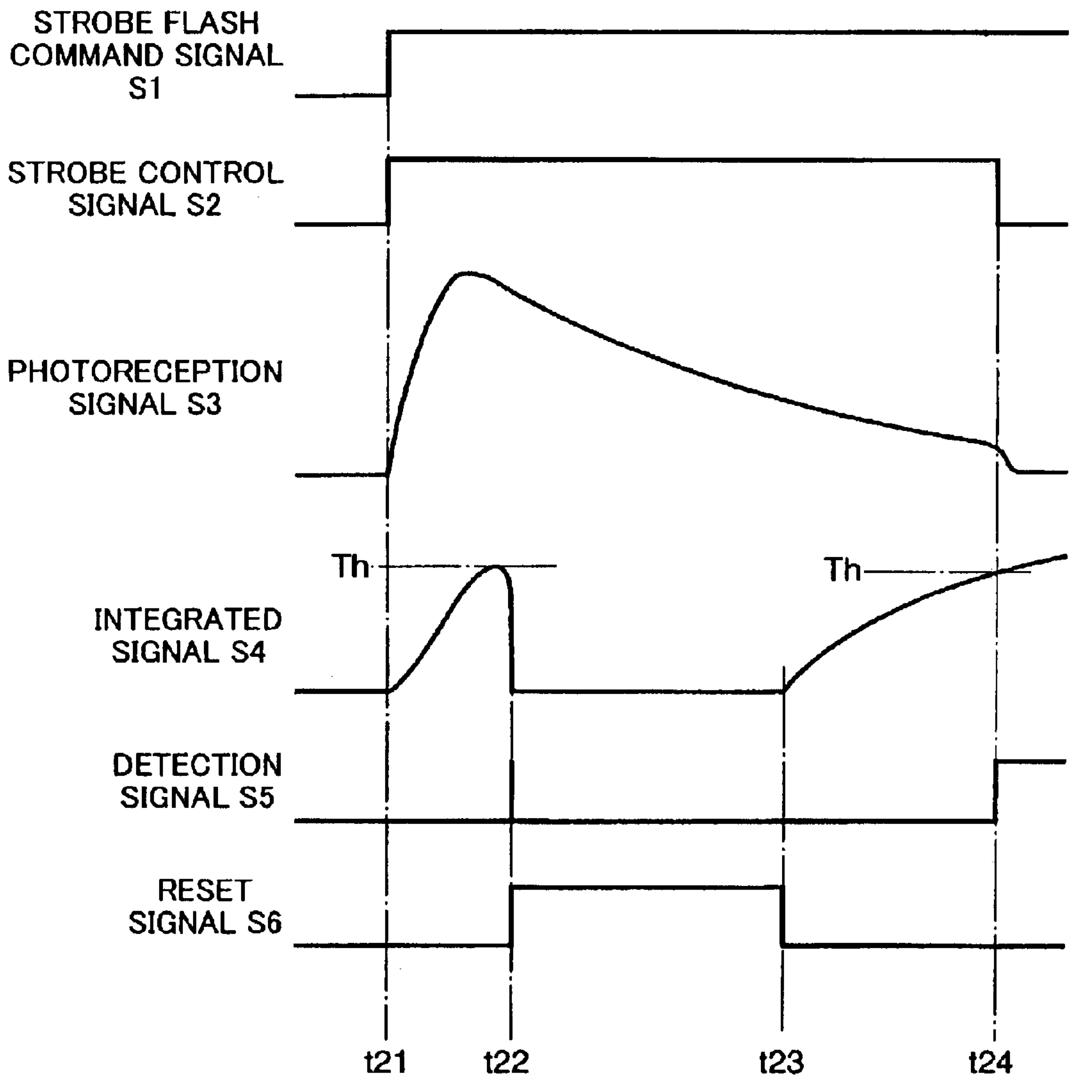

FIG. 7 is a time chart illustrating signals that flow through the circuits of the digital still camera according to the third embodiment.

The above embodiment is such that when the detection signal S5 is output from the comparison circuit 47 within the first predetermined time, the threshold-value voltage applied to the comparison circuit 47 is changed from the first threshold-value voltage Th1 to the second threshold-value voltage Th2 and the aperture of the diaphragm 31 is reduced. In this embodiment, however, the threshold-value voltage is fixed at a predetermined threshold-value voltage Th and the diaphragm 31 is not either. It is permissible to dispense with the diaphragm 31 itself.

When the strobe flash command is applied, the strobe flash command signal S1 is input to the control circuit 41 from the CPU 40 at time t21. When the strobe control signal S2 is applied from the control circuit 41 to the discharge tube 43, the emission of light by the discharge tube 43 starts. Further, the operation of the timer 42 starts. The photoreception signal S3 from the photoreceptor 44 enters the integrating circuit 45 and is integrated, as described above. The integrated signal S4 from the integrating circuit 45 is applied to the comparison circuit 47. When the integrated signal S4 exceeds the fixed threshold-value voltage Th at time t22 within the first predetermined time period, the comparison circuit 47 outputs the detection signal S5.

The reset signal S6 is applied to the integrating circuit 45 from the control circuit 41, whereby the integrating circuit 45 is reset. Integration of the integrating circuit 45 starts again from time t23 and the integrated signal S4 exceeds the threshold-value voltage Th again at time t24, whereupon the control circuit 41 provides the discharge tube 43 with the strobe control signal S2 for halting the light emission. The emission of light from the discharge tube 43 is terminated as a result.

In the above embodiment, the resetting of the integrating circuit 45 and the changing of the threshold-value voltage are performed depending upon whether the detection signal is output from the comparison circuit 47 within the first predetermined time (50 μs) from the start of the light emission. However, it is permissible to adopt an arrangement in which a second predetermined time (e.g., 30 μs) shorter than the first predetermined time is decided and, if the detection signal S5 is output from the comparison circuit 47 within the second predetermined time, then the aperture of the diaphragm 31 is reduced and the threshold-value voltage is changed, as shown in FIG. 6. In this case, it may be so arranged that if the detection signal S5 is output from the comparison circuit 47 within the first predetermined time following elapse of the second predetermined time, the integrating circuit 45 is reset without adjusting the aperture of the diaphragm 31 and without changing the threshold-value voltage.

As many apparently widely different embodiments of the present invention can be made without departing from the spirit and scope thereof, it is to be understood that the invention is not limited to the specific embodiments thereof except as defined in the appended claims.

What is claimed is:

1. A strobe light-emission control apparatus comprising:

a photoreceptor for outputting a signal that conforms to an amount of received incident light;

a strobe light-emission control circuit for controlling a strobe flash device in such a manner that a subject is illuminated with strobe light;

a signal accumulation circuit connected to an output terminal of said photoreceptor for accumulating a signal outputted from said photoreceptor;

a correct signal generating circuit connected to the output terminal of said photoreceptor for generating a correct signal having a level in accordance with an amount of signal accumulated in said signal accumulation circuit;

a subtracting circuit connected to the output terminal of said photoreceptor for subtracting, from a signal that is output from said photoreceptor, a correct signal generated at said correct signal generating circuit;

a switch circuit connected between the output terminal of said photoreceptor and said signal accumulation circuit for switching on at an emission of strobe light from the strobe flash device and switching off when strobe light is not emitted from the strobe flash device;

an integrating circuit for integrating a signal obtained by subtraction by said subtracting circuit; and a strobe light-emission halt control circuit for controlling the strobe flash device so as to halt emission of strobe light based upon an amount of integration by said integrating circuit.

2. The apparatus according to claim 1, wherein said subtracting circuit subtracts the correct signal which was being output from said correct signal generating circuit at a condition of non-emission of strobe light immediately prior to emission of the strobe light, from the signal, which is being output from said photoreceptor upon emission of strobe light.

3. The apparatus according to claim 1, wherein said subtracting circuit carries out subtraction processing for a period of time from emission of strobe light that is based upon control by said strobe light-emission control circuit to halting of emission of strobe light that is based upon control by said strobe light-emission halt control circuit.

4. A strobe light-emission control apparatus comprising:

a photoreceptor for outputting a photoreception signal that conforms to amount of received incident light;

a first strobe light-emission control circuit for controlling a strobe flash device so as to illuminate a subject with strobe light and halt emission of light in response to a strobe light-emission halt signal applied thereto;

an integrating circuit, which is reset with start of light emission by the strobe flash device and is reset in response to a reset signal applied thereto, for integrating the photoreception signal output from said photoreceptor;

a comparison circuit for comparing an integrated value from said integrating circuit and a first reference signal and outputting a detection signal in response to the first reference value being surpassed by the integrated value; and a first control circuit for outputting the reset signal to said integrating circuit in response to output of the detection signal, which is output from said comparison circuit, prior to elapse of a first predetermined time from start of light emission by the strobe flash device, and outputting the strobe light-emission halt signal to said first strobe light-emission control circuit in response to output of the detection signal after elapse of the first predetermined time from start of light emission by the strobe flash device.

5. The apparatus according to claim 4, wherein said apparatus is applied to a digital still camera having a solid-state electronic image sensing device for sensing the image of a subject and outputting a video signal representing the image of the subject, and a diaphragm placed in front of a photoreceptor surface of the solid-state electronic image sensing device, said apparatus further comprising a reset circuit for resetting electric charge, which has accumulated in the solid-state electronic image sensing device, in response to output of the reset signal from said first control circuit.

6. The apparatus according to claim 4, wherein said apparatus is applied to a digital still camera having a solid-state electronic image sensing device for sensing the image of a subject and outputting a video signal representing the image of the subject, and a diaphragm placed in front of a photoreceptor surface of the solid-state electronic image sensing device, said apparatus further comprising a second control circuit for resetting electric charge, which has accumulated in the solid-state electronic image sensing device, in response to output of the reset signal from said first control circuit, controlling the diaphragm so as to reduce the aperture, comparing the integrated value from said integrating circuit and a second reference value that is greater than the first reference value, and controlling said comparison circuit so as to output the detection signal in response to the second reference value being surpassed by the integrated value.

7. The apparatus according to claim 6, wherein said second control circuit performs control of the diaphragm and control of said comparison circuit in response to output of the detection signal from said comparison circuit to the strobe flash unit prior to elapse of a second predetermined time, which is shorter than the first predetermined time, from the start of strobe light emission.

* * * * *